(12) United States Patent  (10) Patent No.: US 8,732,605 B1
Falaki                    (45) Date of Patent:     May 20, 2014

(54) VARIOUS METHODS AND APPARATUSES FOR ENHANCING PUBLIC OPINION GATHERING AND DISSEMINATION

(75) Inventor: Ardeshir Falaki, West Hollywood, CA (US)

(73) Assignee: VoteBlast, Inc., West Hollywood, CA (US)

(*) Notice: Subject to any disclaimer, the term of this patent is extended or adjusted under 35 U.S.C. 154(b) by 336 days.

(21) Appl. No.: 13/070,201

(22) Filed: Mar. 23, 2011

Related U.S. Application Data

(60) Provisional application No. 61/316,535, filed on Mar. 23, 2010.

(51) Int. Cl.
G06F 13/00 (2006.01)
G06F 15/00 (2006.01)

(52) U.S. Cl.
USPC .......................................... 715/780; 715/808

(58) Field of Classification Search
USPC .......... 715/808, 733, 711, 780, 790, 851, 853
See application file for complete search history.

(56) References Cited

U.S. PATENT DOCUMENTS

| | | | |
|---|---|---|---|
| 5,581,800 A | 12/1996 | Fardeau et al. | |
| 5,612,729 A | 3/1997 | Ellis et al. | |
| 5,621,454 A | 4/1997 | Ellis et al. | |
| 5,740,035 A | 4/1998 | Cohen et al. | |
| 5,764,763 A | 6/1998 | Jensen et al. | |
| 5,787,334 A | 7/1998 | Fardeau et al. | |
| 6,035,177 A | 3/2000 | Moses et al. | |
| 6,421,445 B1 | 7/2002 | Jensen et al. | |
| 6,421,724 B1 | 7/2002 | Nickerson et al. | |
| 6,606,581 B1 | 8/2003 | Nickerson et al. | |
| 6,785,717 B1 | 8/2004 | Nickerson et al. | |
| 6,871,180 B1 | 3/2005 | Neuhauser et al. | |
| 6,928,392 B2 | 8/2005 | Nickerson et al. | |
| 7,085,820 B1 | 8/2006 | Nickerson et al. | |
| 7,248,777 B2 | 7/2007 | Feininger et al. | |
| 7,316,025 B1 | 1/2008 | Aijala et al. | |
| 7,319,863 B2 | 1/2008 | Engstrom et al. | |
| 7,343,615 B2 | 3/2008 | Nelson et al. | |
| 7,370,285 B1 | 5/2008 | Nickerson et al. | |
| 7,386,473 B2 | 6/2008 | Blumenau | |
| 7,421,628 B2 | 9/2008 | Wright et al. | |
| 7,421,723 B2 | 9/2008 | Harkness et al. | |
| 7,451,092 B2 | 11/2008 | Srinivasan | |
| 7,460,684 B2 | 12/2008 | Srinivasan | |
| 7,466,742 B1 | 12/2008 | Srinivasan | |
| 7,466,844 B2 | 12/2008 | Ramaswamy et al. | |

(Continued)

OTHER PUBLICATIONS

Webpage for Yelp, http://www.yelp.com/, San Francisco Restaurants, Dentists, Bars, Beauty Salons, Doctors, Jun. 27, 2011, 1 page.

(Continued)

*Primary Examiner* — Cao "Kevin" Nguyen
(74) *Attorney, Agent, or Firm* — Rutan & Tucker, LLP

(57) ABSTRACT

A system to conduct a public-initiated opinion poll on a media space or in a consumer space is discussed. Simple activation of software- or hardware-based buttons or otherwise by speaking into or tapping on a device are provided and enables the public to express its likes/dislikes about anything, anyone, anywhere, anytime and merely when he/she decides to do so. Hence, this system replaces the current survey-based paradigm in which the surveyor decides when to ask what, and how from the public.

17 Claims, 8 Drawing Sheets

(56) References Cited

U.S. PATENT DOCUMENTS

| | | | |
|---|---|---|---|
| 7,478,121 B1 | 1/2009 | Nickerson et al. | |
| 7,809,602 B2 * | 10/2010 | Nickerson et al. | 705/7.29 |
| 7,827,487 B1 | 11/2010 | Nickerson et al. | |
| 7,865,455 B2 | 1/2011 | Nickerson et al. | |
| 2003/0009555 A1 | 1/2003 | Nickerson et al. | |
| 2004/0019688 A1 | 1/2004 | Nickerson et al. | |
| 2004/0049417 A1 | 3/2004 | Nickerson et al. | |
| 2004/0049534 A1 | 3/2004 | Nickerson et al. | |
| 2005/0240618 A1 | 10/2005 | Nickerson et al. | |
| 2006/0248188 A1 | 11/2006 | Nickerson et al. | |
| 2006/0265368 A1 | 11/2006 | Nickerson et al. | |
| 2007/0288476 A1 | 12/2007 | Flanagan et al. | |
| 2008/0010110 A1 | 1/2008 | Neuhauser et al. | |
| 2008/0033790 A1 | 2/2008 | Nickerson et al. | |
| 2008/0059286 A1 | 3/2008 | Nickerson et al. | |
| 2008/0086304 A1 | 4/2008 | Neuhauser et al. | |
| 2008/0086533 A1 | 4/2008 | Neuhauser et al. | |
| 2008/0091087 A1 | 4/2008 | Neuhauser et al. | |
| 2008/0091451 A1 | 4/2008 | Crystal et al. | |
| 2008/0091762 A1 | 4/2008 | Neuhauser et al. | |
| 2008/0109295 A1 | 5/2008 | McConochie et al. | |
| 2009/0083264 A1 | 3/2009 | Nickerson et al. | |
| 2009/0083654 A1 | 3/2009 | Nickerson et al. | |
| 2012/0046936 A1 * | 2/2012 | Kandekar et al. | 704/9 |

OTHER PUBLICATIONS

Webpage for Crimson, http://www.crimsonhexagon.com/, Crimson Hexagon: Social Media Monitoring and Analysis, Jun. 27, 2011, 1 page.

Webpage for Gallup, http://www.gallup.com/home.aspx, Gallup.com—Daily News, Polls, Public Opinion on Government, Politics, Jun. 27, 2011, 3 pages.

*In re Ochiai*, 71 F.3d 1565, 1572 (Fed. Cir. 1995), 9 pages.

*Ex Parte Wada and Murphy*, U.S. Patent and Trademark Office Board of Patent Appeals and Interferences Decision on Appeal for Appeal No. 2007-3733 dated Jan. 14, 2008, 9 pages. Alexandria, Virginia USA.

* cited by examiner

VARIOUS METHODS AND APPARATUSES FOR ENHANCING PUBLIC OPINION GATHERING AND DISSEMINATION

RELATED APPLICATIONS

This application is a continuation in part and claims the benefit of U.S. provisional patent application titled "VARIOUS METHODS AND APPARATUS FOR ENHANCING PUBLIC OPINION GATHERING AND DISSEMINATION" Ser. No. 61/316,535, filed Mar. 23, 2010.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD

An aspect of an embodiment relates to an intelligent way to allow the public/users to initiate a survey/opinion poll that can be aggregated and categorized.

BACKGROUND

In the past, most of the opinion systems were either survey-based, in which the questionnaire decides what opinions are expressed, or if user-initiated, the user expresses his/her opinion in text and almost free format which mostly can lead to many opinions being expressed in multiple sentences, or paragraphs, making them hard to search, specifics mixed hidden in broad terms, difficult to analyze or compare, etc. In cases where a quantized method was used (e.g., numbered rating), the subject was pre-selected and then provided to the user, hence limiting the user's ability to very specifically select a subject.

SUMMARY OF THE INVENTION

An opinion polling system is described. In an embodiment, the system conducts a public-initiated opinion poll on a media space or in a consumer space. 1) Simple activation of software- or hardware-based opinion level buttons or otherwise 2) by speaking into or 3) by tapping on a device are provided, which enable the public to express its likes/dislikes about anything, anyone, anywhere, anytime and merely when he/she decides to do so. Hence, this system replaces the current survey-based paradigm in which the surveyor decides when to ask, what to ask on, and how from the public.

In an embodiment, an application resident on the client device communicates over a network with a server and database. This client device-server system is configured to enable a user of the client device to conduct a public-initiated opinion poll to express 1) likes, 2) dislikes or 3) any combination of the two about anything, anyone, anywhere, and anytime. A module, such as an application on the mobile device or resident on the server, may be configured to present a template for the opinion poll to allow greater specificity and user customizing of the opinion poll to the user of the client device initiating this opinion poll. A user interface of the module presents a subject field on a display screen of the client device. The server may be configured to recognize content in the subject field as choosing and setting the subject matter of the opinion poll. The content of the subject field is solely initiated and decided by the user and not pre-selected by a third party and then presented to the user of the client device to give their opinion about that pre-selected subject matter of the opinion poll. The user interface and subject field are configured to enable the user of the client device to select an overall subject and even specific features of that subject, which the user wishes to create the opinion poll on. The module is configured to enable the user of the client device to choose when to express his/her opinion, exactly about what subject matter to express his/her opinion on, and then to express his/her opinion level by activating/pressing a single opinion level button that has a very specific meaning.

The client device communicates the content entered into the subject field of the user interface to set the name and subject matter of the opinion poll over the network to the server potentially located on the World Wide Web. A software program resident on the server takes in the details of the opinion poll. The backend server aggregates the opinion level expressed by activating/pressing the opinion level button with all of the cast opinion levels previously submitted by users of different client machines on this opinion poll and feeds this information back to the client device to be displayed on a display screen of the client device as well as feeds this information back to providers/paying customers.

BRIEF DESCRIPTION OF THE DRAWINGS

The multiple drawings refer to example embodiments of the invention.

Figure 1:
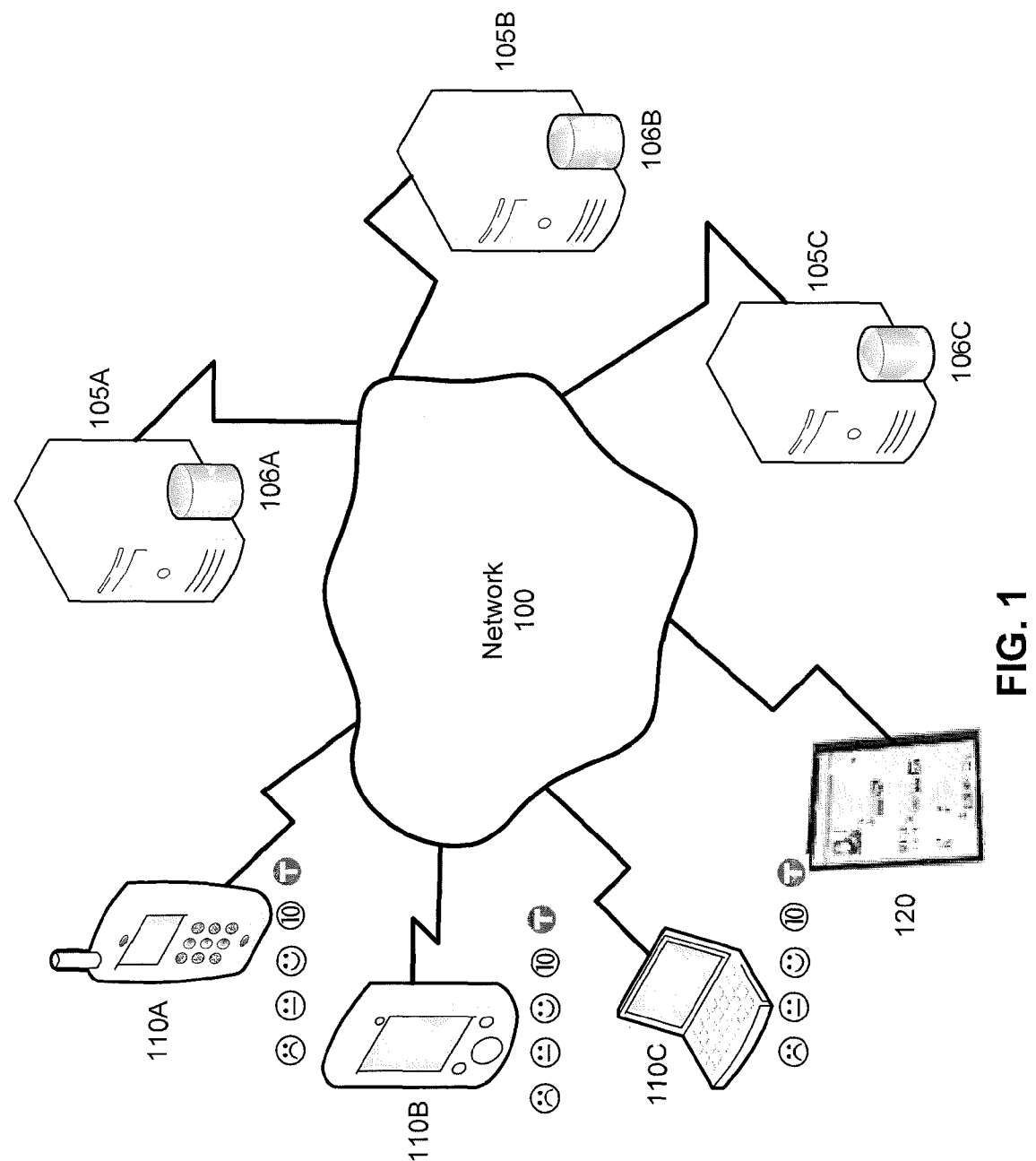
FIG. 1 illustrates a diagram of an embodiment of a client-server network environment to implement the user-initiated opinion polling system.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific routines, named components, connections, internet opinion polling technology, etc., in order to provide a thorough understanding of the present invention. It will be apparent, however, to one skilled in the art that the present invention may be practiced without these specific details. In other instances, well-known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. Multiple embodiments will be discussed and it is understood by the inventors of this application that features of a first embodiment may also be implement another embodiment.

Below example processes and apparatuses provide a user-initiated opinion polling system that fundamentally and substantially enhances public opinion gathering, dissemination and utilization by:

changing the commercial polling and surveying paradigm; and redefining the way the consumer is heard by enabling the consumer to express his/her likes/dislikes on the subject of his/her choosing anytime, anywhere and when AND ONLY when the consumer initiates the survey/opinion process. Many embodiments will be described in which the system conducts a public-initiated opinion poll through 1) a media space, such as the Internet, web TV, an interactive or non-interactive cable TV, satellite TV, Internet-based TV, mobile phone network, etc., and/or 2) a consumer space such as a store, restaurant, mall, movie theatre, lecture hall, live concert or public event venue, etc. The client server system can conduct the opinion poll on subject matter on anything such as 1) content in the media space or consumer space, 2) a physical item such as a retail store consumer product or point of sales display, a billboard, an advertisement, a restaurant menu item, a club's ambience, etc., 3) an entertainment item such as a movie or play being played or performed in a theatre, or a lecture or speech in a room, 4) a videogame being played, 5) people, a person, a person's possession or attribute, 6) anything else; and thus, a user-initiated opinion poll on anything, anywhere and anytime, that is automatically captured and sent to a main server system.

FIG. 1 illustrates a diagram of an embodiment of a client-server network environment to implement the user-initiated opinion polling system. An application resident on the client device 110A-110C communicates over a network 100 with one or more servers 105A-105C and their databases 106A-106C. This client device-server system is configured to enable a user of the client device 110A-110C to conduct a public-initiated opinion poll to express 1) likes, 2) dislikes or 3) any combination of the two about anything, anyone, anywhere, and anytime. The client devices such as a smart phone 110A, Personal Digital Assistant/Tablet 110B, Laptop computer 110C may have a browser application resident along with one or more client applications scripted to run the opinion polling system operations and cooperate with the server.

The server, such as a first server 105A, maintains the opinion polls and keeps a profile of the opinion polls. When the server is an internet site, the server may service one of a traditional website, a social media space, or any combination of the two and may be comprised of at least one or more servers and cooperating databases. This new, simple, customer-initiated paradigm for public and commercial polling and surveying enables anyone to easily express opinions on any subject of his/her interest, using opinion level icons, and/or view others' opinions that might have been previously cast on a subject of his/her interest. A module, such as a client application on the mobile client device or server applet resident on the server, may be configured to present a template for the opinion poll. The client application has code scripted to present one or more opinion templates that are user customizable, have a subject field, and is configured to work with a browser and a remote server. The server applet works with a browser application resident on the client device and serves one or more web pages 120D to the client device with the resident browser.

Figure 2:
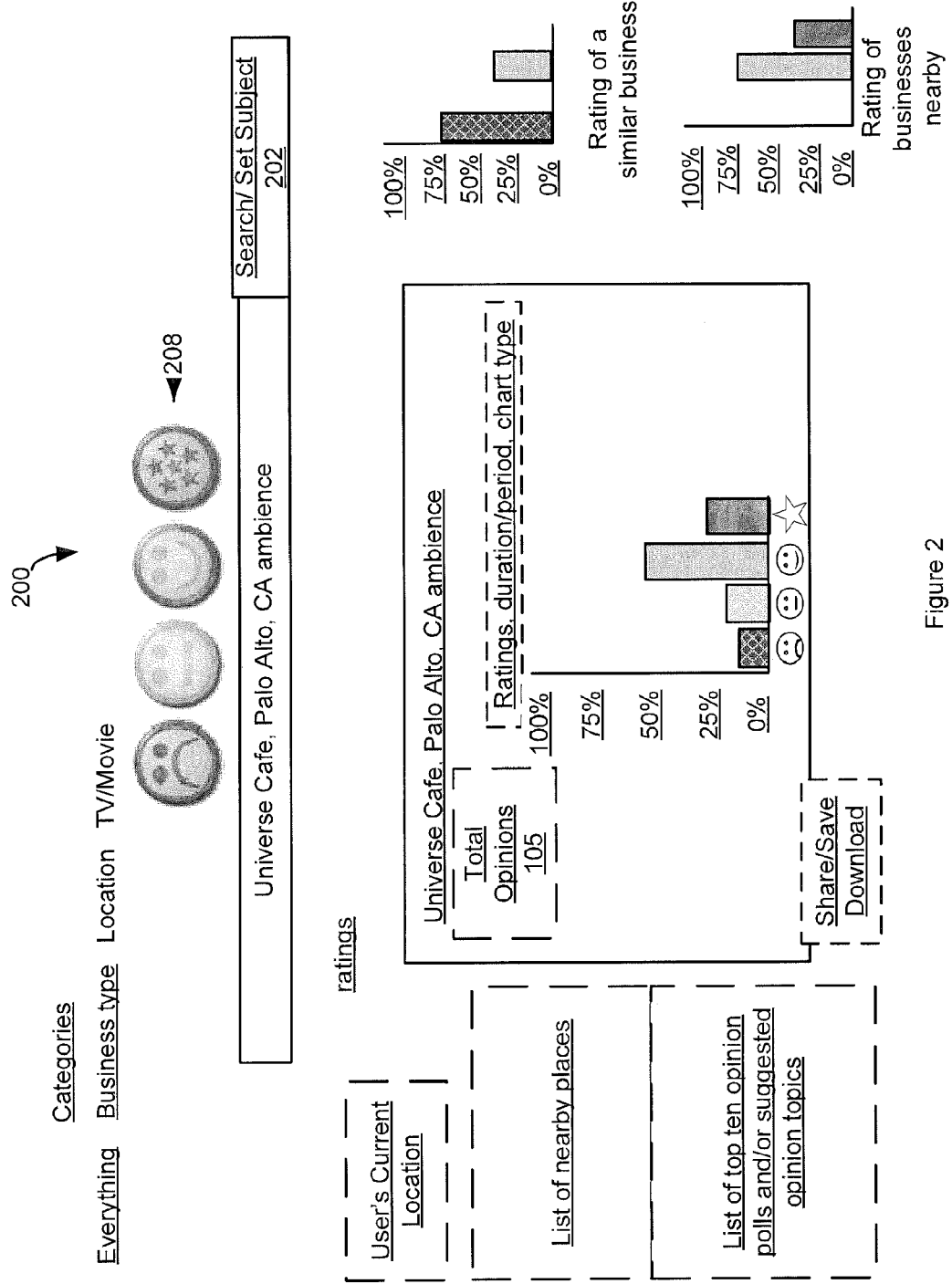
FIG. 2 illustrates a diagram of an embodiment of an opinion poll presented by a module to a user of a client device.

FIG. 2 illustrates a diagram of an embodiment of an opinion poll presented by a module to a user of a client device. A module, such as a client application on the mobile client device or server applet resident on the server, may be configured to present a template 200 for the opinion poll to allow greater specificity and user customizing of the opinion poll to the user of the client device initiating this opinion poll. A user interface of the module presents a subject field 202 on a display screen of the client device. The server may be configured to recognize content in the subject field 202 as choosing and setting the subject matter of the opinion poll. The content of the subject field 202 is solely initiated and decided by the user and not pre-selected by a third party and then presented to the user of the client device to give their opinion about that pre-selected subject matter of the opinion poll. The user interface and subject field 202 are configured to enable the user of the client device to select an overall subject matter and even specific features about that subject matter, which the user wishes to create the opinion poll on. The module is configured to enable the user of the client device to choose when to express his/her opinion, exactly about what subject matter to express his/her opinion on, and then to express his/her opinion level by activating/pressing merely a single opinion level button that has a very specific meaning e.g. BAD, GOOD, EXCELLENT with these simple software—or hardware-based buttons such as ☹☺☻♡ . For example, any of the four opinion level buttons 208 may be activated.

The module may be configured on the opinion poll template 200 to provide subjects about which the user of the client device may be interested in by both 1) on a home page of the server showing a listing of opinion poll topics and their associated statistics that any user visiting the home page may be interested in reviewing, which these opinion polls were originally generated by other user's opinion polls and then maintained on the server and database, and 2) the user interface of the module presents a search field 202 configured to receive content of the query from the user device and then to bring back a listing of opinion poll topics and their associated statistics that the user of the client device may be interested in reviewing based on the content supplied in the query. For example, the module might present the Top Ten opinions for that day to any user viewing the site and increase the interest factor based on the particular user's location, current time, and previous subject matter or opinion levels expressed. Note the search field and subject matter field 202 may be the same field but different actions occur based on subsequent actions. For example, when the search field icon is activated/clicked on by a mouse then the server retrieves similar opinion surveys. However, when an opinion level icon 208 is activated then the client application sends the content in the subject field 202 along with all of the other associated data to the server for tallying.

Upon the server returning opinion lists or the user typing in a subject matter free form, the user chooses the subject matter about which he is interested to express an opinion, or in the case of a search which opinion statistics (of other users opinions) he/she is interested in reviewing. For example, the server categorizes and associates similar subject content to the content in the subject field 202 and sends that similar subject content back down over the network to the client application on the client device. The user could select an existing survey to review and potentially add their cast opinion on, start their own new survey on that subject matter, or slightly amend the subject matter of the survey to address and start a survey targeted at a specific feature of the general subject matter that the user wishes to create an opinion poll on. For instances, the general subject matter that the existing survey is on could be a restaurant and that subject matter may be populated as a list of possible topics for the user to choose and/or pre-populated into the subject field 202 as text for the user to choose based on a location of the client device, a completion of any logical extensions of the text being typed into the search field, etc. However, the user of the client device may want to specifically start an opinion poll on the hamburgers at that restaurant; and thus, would amend the words in the subject field 202 to specifically discuss the hamburgers at that restaurant. Thus, a user can easily search for, or express opinion about, the exact subject (e.g., 'Joe's Bar & Grill Hamburgers', 'noise level at Sundance Steak House', 'Obama's foreign policy', 'Jack the bartender's jokes', 'The King's Speech music score', 'Lady Gaga's hair', etc.

The module may be scripted to allow the user to decide the subject matter of the opinion poll by two or more of the following 1) the putting in of text or symbols in the subject field 202 either by the user typing in words or accepting the pre-populated suggested words supplied from the server, 2) the user speaking the subject matter of the opinion poll into the microphone of the client device, and the application using a speech to text routine to populate the subject field 202, 3) the user scanning an object to be the subject matter of the opinion poll by swiping the mobile client device against the object and a sensor inside the mobile device using Near Field Communication (NFC) or Radio Frequency IDentification (RFID) technologies recognizes that object and/or reads the object's ID code to populate the subject field 202, 4) the user taking a picture of an object with the phone camera built into the client device and the client application is scripted to pass the image of the object for image recognition by the server and database, and 5) other similar methods. The server then sends down a list of one or more subject matters and their suggested words to populate the subject field 202 based on relevancy to the recognized object in the picture. In an embodiment, the subject field 202 is populated with a textual and/or symbolic representation of the subject matter of the opinion poll with any of the four above ways, and the user is allowed to override or amend the populated text and symbols with the specific words the user wishes to be the subject matter of the opinion poll which he is initiating and/or in which he is participating.

The module receives confirmation that the subject matter of the opinion poll is chosen by the user by activation of one of the opinion level buttons 208, activation of the subject field icon 202, or some other method discussed in more herein. In an embodiment, when the module receives confirmation that the subject matter of the opinion poll is chosen by the user, then the module offers the user with a limited number, less than ten, of opinion level buttons (e.g., 4-5) 208, which an activation/pressing of a given opinion level button registers a certain level of opinion (e.g., "bad", "so-so", "good", excellent"). The activating of that opinion level button is recognized by the module to both set the subject matter of the opinion poll and the user's opinion level, and the module then transmits the subject matter, opinion level, the time and date, available user demographics, and any client device sensor information collected by the module over the network to the server.

The module may also be configured to allow the user to express an opinion level by two or more of the following 1) by activation/one mouse click of any of a 'limited number of'/ constrained set of three or more opinion level button icons but less than ten opinion level button icons 208, 2) by a software routine resident in the client application that translates detected tapping on the mobile device into a selection of a specific opinion level icon (e.g., one tap thru four or more taps is translated to "bad" thru "excellent"), and 3) by a software routine resident in the client application that translates a detected amount of force in a shake of the client device, gently or roughly, into a selection of a specific opinion level icon 208, then the application resident on the client device collects this information and communicates this opinion level/rating on the subject matter of the opinion poll over the network to the server. The server then passes this information onto the database. The user has expressed an opinion level of his/her approval or disapproval about the exact subject matter that the user desires including any segment, part or the entire program/service/product, voluntarily and without having been prompted for that opinion.

Referring to FIG. 1, each client device 110A-110C can communicate the content entered into the subject field of the user interface to set the name and subject matter of the opinion poll over the network to the server 105A-105C potentially located on the World Wide Web. A software program resident on the server, such as the first server 105A, takes in the details of the opinion poll. The backend server aggregates the opinion level expressed by activating/pressing the opinion level button with all of the cast opinion levels previously submitted by users of different client machines 110A-110C on this opinion poll. The information is passed to the database. The server then checks the database to see 1) if the subject content, exactly as chosen or expressed, exists in the database as well as 2) if similar titles of subject content exist in the database. Thus, a software program resident on the server is coded to take in the details of the opinion poll, aggregate those details with any opinion poll data for this opinion poll stored in the database, and categorize those details. The server then feeds this information back to each client device to be displayed on a display screen of that client device as well as feeds this information back to providers/paying customers. Each time an update occurs to the opinion poll the server may merely feedback the updated polling information to client device casting an opinion level or all of the client devices that have cast a vote on that opinion poll. The web application on the server can cooperate over a wide area network, such as the Internet or a cable network, with two or more client machines each having resident applications.

Referring to FIG. 2, the server returns the existing opinion polls in a list presented by the application for the user to select from if they choose, and when an existing poll is selected by the client device, the server returns the existing opinion poll and its statistics appear in the form of a chart (bar, graph, etc.) If there are more subjects which names partially match the user selection (e.g., "Starbucks Latte Taste", Starbucks Latte Price", etc.), then user will get a list of all options, which he can choose from or add to (e.g., "Starbucks Latte Calorie Content", or "Starbucks Latte Taste During Christmas", etc.).

When the user's opinion has been captured by a server applet resident on the server, the server applet sends back an acknowledgement (a sort of feedback, light, message, etc.) to the browser of the client device indicating that the opinion was captured. The server applet sends back an updated chart graph of the opinion poll to be displayed on the display screen of the client device. The updated chart indicates at least a number of times each particular opinion level rating has been cast and what the total aggregate number of opinions cast are. Thus, after the user activates the particular opinion icon, the application on the server sends the tally information from the database to the application resident on the client device to immediately display of the results in easy to understand and compare chart formats (e.g., bar, pie, etc. with simple but powerful data such as the number of times each particular opinion level rating has been cast and what the total aggregate number of opinions cast are, without a complicated listing of user text based comments to filter through. (See FIGS. 2 through 4).

Note, the physical characteristics of the hard/soft opinion level buttons 208 such as shape, color, graphical/textual labels, industrial design, etc. will be associated with the opinion level types that might be expressed using, and captured by, the system (e.g., 'outstanding', 'good', 'bad', 'terrible', etc.). Thus, a computer operator using a web browser type application is provided by the system a simple means, such as utilizing a hand-held appliance or software running on a 3rd party device (e.g., an iPhone, other mobile phones, a PDA, a browser, a TV remote control, a computer, etc.) consisting of a number of ways to choose a subject for the opinion poll and expression through these few hard/soft 'opinion/action buttons.

Referring to FIG. 1, a user interface of the website serviced by the server allows business partners as well as users of client devices to view statistics in real-time in two or more of 1) a recorded profile of the opinion poll data, 2) an analyzed profile of the opinion poll data, 3) a raw profile of the opinion poll data, and 4) other formats, which allows business partners to search the opinion poll data by date, opinion level, and other parameters to provide real-time market research. The user interface of the client device can offer a series of useful business choices based upon a subject matter of the opinion poll including 1) statistics of opinions on similar subjects or other businesses in the neighborhood, 2) presentation of relevant advertisements on the display of the client device directed by a business partner of the website, and 3) presentation of coupons on the display of the client device that the system determines the user may be interested based on 1) voted likes/dislikes, 2) current location indicated by GPS relative to the business address, 3) demographics of the user of the client device and 4) other similar information. Thus, the system provides users, active or passive, a variety of useful tools such as a "Top Ten" lists of most expressed opinions, best of in that category, worst of in that category, coupons, topic options, etc., all by category as well as based on automatic category selection which itself is based on the user's automatically sensed data (e.g., location, previous opinions expressed, etc.). The business partners can influence the data passed to the user by the system to allow a highly focused customer reach for that business partner based on the user of the client device likes/dislikes, location, and demographics collected at the instant of customer engagement with a product or service.

For example, a business partner such as a restaurant could set up many opinion polls on aspects of their business. The server sends all of these already existing opinion polls to the user of the client device when they are near or at the restaurant. The restaurant obtains opinions and reviews of others' opinions on the restaurant. The application on the server offers statistical analytical tools to the business partner to search by date, opinion level etcetera to obtain more specific feedback than text based comments. For instance, the restaurant may see that on Tuesdays indicated by the dates of the opinions, the comments on the food at the restaurant are lower than other days. In addition, this is an easy way to define top opinion choices (survey items) for customers who are visiting the business. The restaurant customer survey automatically pops up on the smart phones at the restaurant based on the location of the client device and having the client application active. This automatically replaces a paper survey methodology at a very low cost. Businesses can also bench mark their own data vs. other businesses' by type, location, date, customer type, etc. For example, a chain restaurant management may find that in their restaurant location #4 people are happier with food than their other locations, while their restaurant location #7 seems to have the most complains about "service", or that overall their restaurants get lower user opinion ratings regarding "food" than restaurants within one mile of their restaurant locations.

In another embodiment, the application resident on the client device is scripted to start recording through its microphone an audio track and then communicates the audio track from a movie or other audio program along with a current date and time indicated on the client device over the network to the server potentially with other information including GPS of the client device. The server may optionally return a selectable list of movies playing at that GPS location, and/or TV or Radio shows playing at that current time, to the client device to assist the user in identifying the source of the audio track. The server cooperates with the database to identify the source of the audio track that the microphone of the mobile device picked up by trying to find the same audio track in the database. The server then attempts to match the time-synchronized portions of the same audio track in the database to the audio track that the microphone of the mobile device picked. The user interface also captures the user's activation of the opinion icons expressing their likes or dislikes with portions of the audio track that corresponds to segments/scenes within a movie or TV show. Thus, the user of the device casts an opinion level with time stamps on one or more segments within the movie, TV show or radio show and then the segment supplied from the client device is matched up with the same time segments of the audio clip stored in the database, which then can be correlated to a particular scene within the movie, Radio show, or TV show, and the opinion level icons cast on that segment of show are tallied and posted like other opinion polls.

The server that hosts the web site also is scripted to facilitate downloading of the client applet to the client machines, directly or indirectly through another server site. The applet may also have built-in coding to be virally replicated to be spread across multiple social network platforms and coded to be properly placed within a structural organization of each social network platform with the viral coding specifically scripted to facilitate embedding the client applet within the media space. Each instance of the applet may allow the new instance to be passed along as a viral instance to 'friends' to allow other members of that social network cast their vote on the poll as well as friends visiting the personal profile page where the new instance is hosted can also cast their vote.

The user of the client device has 100% control over 1) the time when to initiate the survey, 2) the place to initiate the survey from a mobile wireless computing device, a mobile phone, a desktop wired into the internet, or even a handheld remote for expressing an opinion on consumer products in a store, and 3) the subject matter of the opinion poll.

In an embodiment, the user interface presents only a simple subject field on which the subject matter of the opinion poll will be on. The user is enabled to set the opinion poll on even a specific sub-feature of a given subject by filling in the text of the subject field and after the subject field is populated, then the client application changes a state of the set of opinion level button icons to allow one of them to be activated by the user to cast their opinion rating/level on the subject matter of the opinion poll. No text box is presented to the user for the user to make additional comments, which later on is hard to read and search through for later users to obtain relevant information from. Further, no need to type lengthy sentences with commands on smart phone keypads, or sift through lengthy opinions. Thus, the expressed opinion level about the subject matter of the opinion poll is encompassed by the user activating, such as pressing, one of the opinion level buttons and the client application passing at least this information to the server and database for tabulation.

Figure 3:
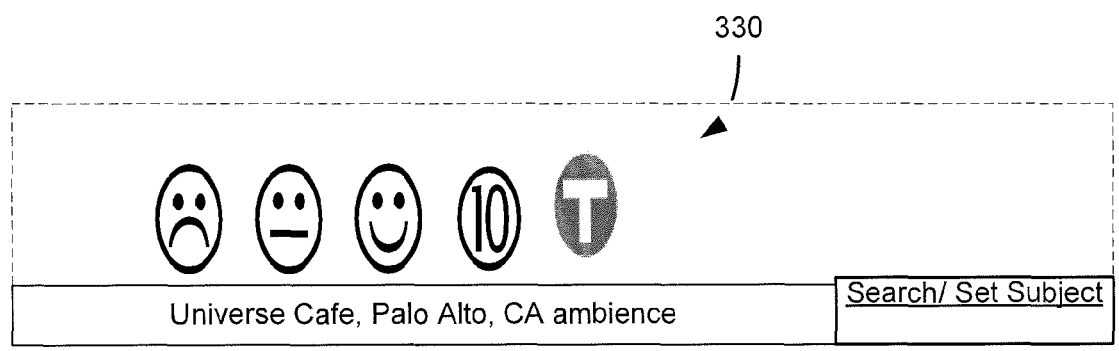
FIG. 3 illustrates a diagram of an embodiment of a plug in type application to implement the user-initiated opinion polling system.
Figure 3:
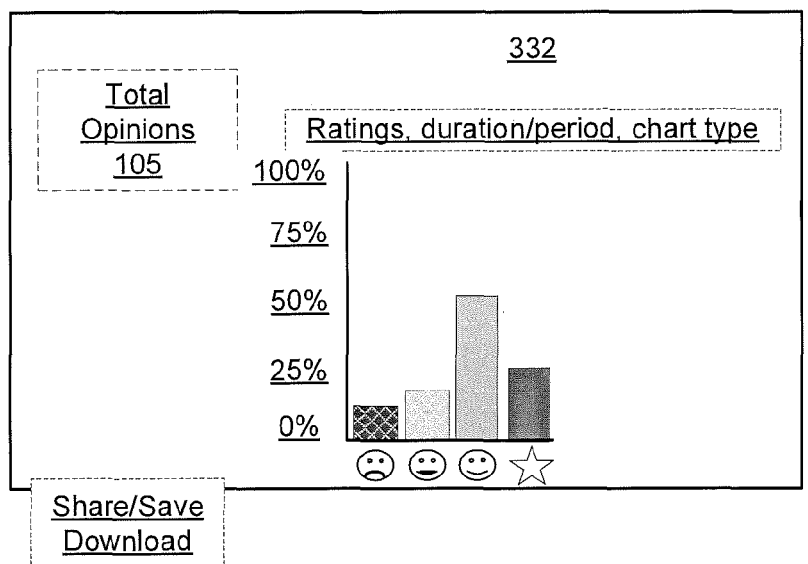
Figure 4:
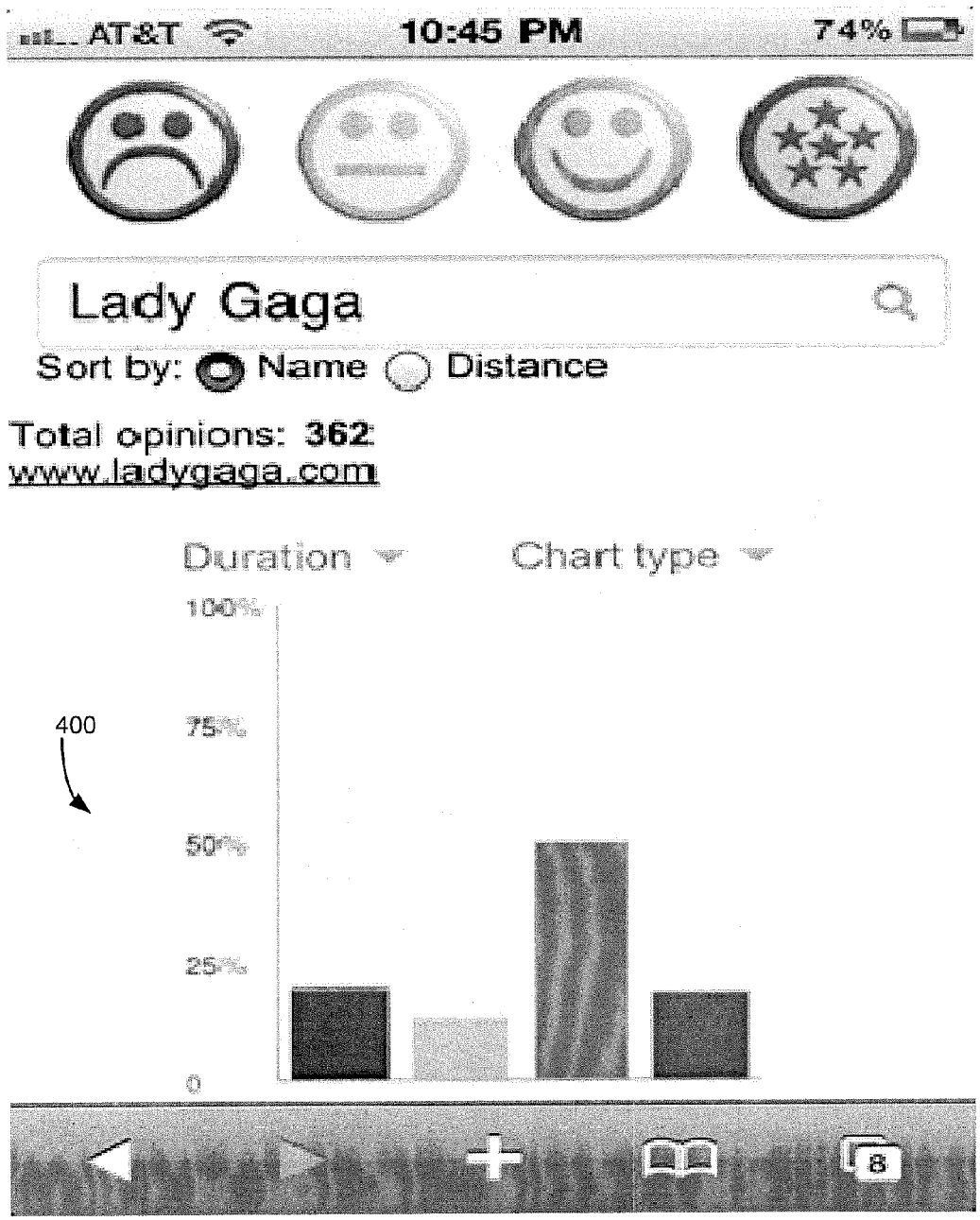
FIG. 4 illustrates a diagram of an embodiment of an opinion poll presented by a module to a user of a client device.

FIG. 3 illustrates a diagram of an embodiment of a plug in type application to implement the user-initiated opinion polling system. An internet plug in application is configured to work with a browser of the client device and the server to offer an Internet user viewing a web page a small transparent mouse-controlled movable overlay graphic 330 representing soft buttons that indicate multiple selectable opinion level iconic choices (e.g., 'outstanding', 'good', 'bad', 'terrible', 'view opinions', etc.). The overlay 330 may detect the subject matter of the opinion poll by interrogating the web page, through any of image analysis, Optical Character Recognition, analyzing the coding structure of the web page, or 2-D spatial referencing of the specific location of the web page being viewed, and thus, the user can 'move' the overlay by dragging it to anywhere on the web page and then press/click one of the soft opinion level buttons to take an action such as expressing his/her voice/opinion about the specific content or portion of the web page located immediately under the overlay at that moment, and the subject field will be pre-populated by text supplied by the server corresponding to the overlaid subject matter. The user can amend or override the populated text, and the application then sends the opinion level, subject matter of the opinion poll.

Opinions expressed by pushing the opinion buttons along with other information such as the specific location of the web page on which the overlay was located at the time of the buttons were pushed, a content tag which maybe some of the content under the overlay, the URL, user demographics, etc. are then sent to the 'opinion collection/dissemination website' on the Internet for storage and utilization in different ways later. Additionally, after an opinion is cast, the plug in may display the tallied results 332 to the client.

Once again, pressing the 'view opinions' soft button on the overlay opens a larger non-transparent window, which contents are requested over the Internet from the 'opinion collection/dissemination website', displaying historical opinions expressed by other users about the content of the particular location of the web page on which the overlay/window is placed and/or the entire page/subject displayed, offering the user the options to view opinion statistics, other users' comments, blogs, links, etc. and to add his/her own comments if he/she so chooses.

In an embodiment, the server applet may be embedded into a third party's media space, such as an HTML web page. A browser from a client machine may interact with the web page that contains the embedded applet, and then spot the voting buttons presented by a user interface of the applet. The web page may be served by a web server on any HTML or WAP enabled client device or any equivalent thereof such as a mobile device or personal computer. The server serves pages that allow entry of demographic details and further pages that allow entry of comments, etc.

Additional Points

In an embodiment, the client device that runs a browser or browser-like feature with the application as described above sends the opinion level of a user along with relevant the information, such as those about the product or service that is the subject of the opinion and time/date of the opinion, etc., to a server to maintain the opinions and keep a profile of the opinions. The application in the client device may have a detector routine scripted to detect other applications on the client device as well as sensors built into the client device, and then capture information from these other applications and the sensors, and when the user wishes to express an opinion the application then transmit this sensor data and other resident application information along with the subject matter and opinion level information from the client device over the network to the server. The client device sensory information may include two or more of the following (e.g., Global Positioning System (GPS) information, Radio Frequency IDentification (RFID) information, Near Field Communication and other similar sensors) and the sensor data is passed to the server so that the application on the server can look up subject matters in the database close to this user's location, and/or closely related to the ID of this object to help the user to set/choose the subject matter of the opinion poll more easily by sending a list of suggested subject matters in a drop down menu or by pre-populating the subject field with these relevant words.

Some additional sensory information transmitted can include: user information—location, demographics, etc.; location; time index stamp (e.g., minute 23 of the movie, concert, speech, or other event); picture; barcode; URL; Near Field Communication; Opinion time stamp; device and opinion authentication information; and other similar information.

For example, using the GPS information available to the device the user is using in conjunction with the channel number of the TV program the user is watching and the day/time information, the system can, using the data available on the world wide web, figure out exactly what part of which TV program the user is expressing his/her opinion on. The determination of the subject matter about which the user is expressing his/her opinion could also be done as a combination of user selected (e.g., by inputting or selecting from a menu of options information) and the system's automatic enhancement of the information (using the GPS, RFD, NFC, etc. data) to figure out the exact subject matter about which opinion(s) is/are being expressed. Using NFS (Near Field Communication) or any scanning technology, the user can choose a subject, or be aided in choosing a subject, also by touching, swiping, or moving his/her device in the proximity of something. The subject may also be chosen by the user speaking it in to a microphone on his device, which can recognize speech and convert it to computer data format.

The media space, client applet, and resident software program cooperate to gather data not on whether a particular program/service/product is being watched/browsed at but also allows communication on how the person(s) watching/viewing that particular program/service/product feels about that particular program/service/product.

One or more taps on the phone allows some smart phones equipped with sensory devices, such as an accelerometer, to translate an opinion level to the buttons described above. In such cases one or more taps on the phone, or a gentle vs., strong shaking of the phone could replace the user's pressing of the iconic buttons to express his/her like/dislike of a subject.

On the resident client applet, once a button is pressed a unique code consisting of information about the event (e.g., TV channel/movie being watched, program time, time of the specific opinion expression, event code(s), the customer demographics, etc.) as well as the button ID may be sent in real time, or later, to a website for real time or delayed viewing, analysis and dissemination in a variety of user-defined or automatically selected mechanisms/formats including but not limited to search-based, sorted, listed, graphical, text, animated, overlay on other programs/event-related information, pictures, video, audio, etc.

The system may also use an Appliance-Website Combination. The appliance enables the user to indicate expressions or provide opinions related to an event such as a broadcast TV/radio program, movie being watched in a movie theatre, live theatrical play, sporting event, concert, or lecture, in real-time, as freely, easily and frequently as the user desires without ever being prompted, requested for or questioned for that opinion. The appliance can take different forms including any device that runs a web browser or a subset of a browser capable of communicating with the world wide web, a smart phone such as an iPhone or Android running a browser or the special coded applet, a hand-held device, buttons on cable/satellite remote controls, a PC/PDA/Mobile, etc.

The web site collects all users' expressions in a privacy-friendly manner, stores, statistically analyzes and presents them to the visitors of the site and/or partners (e.g., the broadcasters interested in the data). The website is scripted to present the data in real-time or stored fashion in raw or analyzed formats. The website is scripted to provide advanced statistical data search functions. The website is scripted to enable users to establish personal opinion profiles, links to social network sites, opinion event-based alarms, etc.

The web site features a routine scripted for search & view opinions/statistics on events (in progress or recorded). The user interface presented allows the search by name, time, zip code, broadcast channel, station, program name, program segment, time-counter, opinion quality/quantity, etc. The web-site cooperates with broadcasters to detect for more program tags such as character lines, subject matter discussed, etc. and those tags can be included as part of the reported statistics. The user interface of the website allows content partners as well as consumers to view statistics in real-time or recorded, analyzed or raw, sorted per profile or otherwise specified, etc.

The user interface of the website presents screens to a browser of a client machine to allow a user to Create/Manage/View a voting profile/history, which linkable to, and shareable with, a social network profile page on Facebook, Twitter, Myspace, etc. The user interface of the website allows a user to have real-time viewing of friend's votes, voting/viewing habit/profile, etc. A tracking routine resident for the website sends automated programmable alert message transmission (e-mail, text, etc.) to self or 'friends' and 'followers', e.g. letting them know about the poll/opinion and giving them the opportunity to express their vote. The tracking routine sends the message to friends, and/or the followers, if the user likes a particular program, or program segment, beyond a certain previously defined likeability threshold. The tracking routine may send e-mail messages to the broadcasters, etc. about programs or program segments.

The tracking routine may obtain its input from an aggregation module on the website. The aggregation module monitors one or more ports on the server that are sent this information on the poll from the client machines/appliances. A few hard/soft 'opinion/action buttons', for an applet resident on a client machine exist to express an opinion or voice his/her approval or disapproval of/about any segment, part or the entire program/service/product voluntarily and without necessarily having been prompted for it. The server hosts the aggregation module that cooperates with the applets on the all of the client machines/appliances. The server also hosts an associated web site where the results of the opinion are posted and aggregated with other opinions on the same program/service/product. Later an intelligence engine at the server can match up semantically similar concepts when displaying this survey result and other similar semantically similar surveys. A wizard on the website is configured to assist the browser of a user on a client machine to download the applet from the website.

The website references a database of content/service/product providers and gives feedback about the content/service/product directly to these content providers as well as publishing the opinions on the website and distributing the published opinions/survey results be viewable in various social networks.

The opinion level buttons may be augmented with a view opinion button. Pressing the 'view opinions' soft button on the overlay opens a larger non-transparent window, which contents are requested over the Internet from the 'opinion collection/dissemination website.

In the movable overlay graphic embodiment, pressing the 'view opinions' soft button on the overlay opens a larger non-transparent window, which contents are requested over the Internet from the 'opinion collection/dissemination website', displaying historical opinions expressed by other users about the content of the particular location of the web page on which the overlay/window is placed and/or the entire page/subject displayed, offering the user the options to view opinion statistics, other users' comments, blogs, links, etc. and to add his/her own comments if he/she so chooses.

The system enhancing on-line opinions as well as enhancing other media space opinions with appliances allows framing of the question and a survey for the opinion poll to be either very specific or very loose by allowing the user to select free form what they are expressing their opinion on, and type in the question and/or survey subject. Later the intelligence engine at the server can match up semantically similar concepts when displaying this survey result and other similar semantically similar surveys. Thus, this leaves no opinions unheard and value un-realized. The system accurately reflects opinions of young viewers, minority viewers, as well as adult viewers and non-minority viewers by tracking which users are voting. If the user is not a previous user of the system, then the user interface presents a screen to obtain the demographic data from the user voting on the poll. Since the applet may be virally spread from one user to another user, the system can use live video streaming, polling and blogging techniques to combine qualitative and quantitative survey capabilities. The system conducts surveys for clients to understand how the public is thinking or reacting to major issues on a national or international scale. The system provides feedback services to content providers and to a social network. However, this feedback from the user is not solicited i.e. the button may be embedded by a user/consumer and then the user may give their unsolicited opinion.

Additional Embodiments

Example Command Receiver/Re-Transmitter Device

Figure 5:
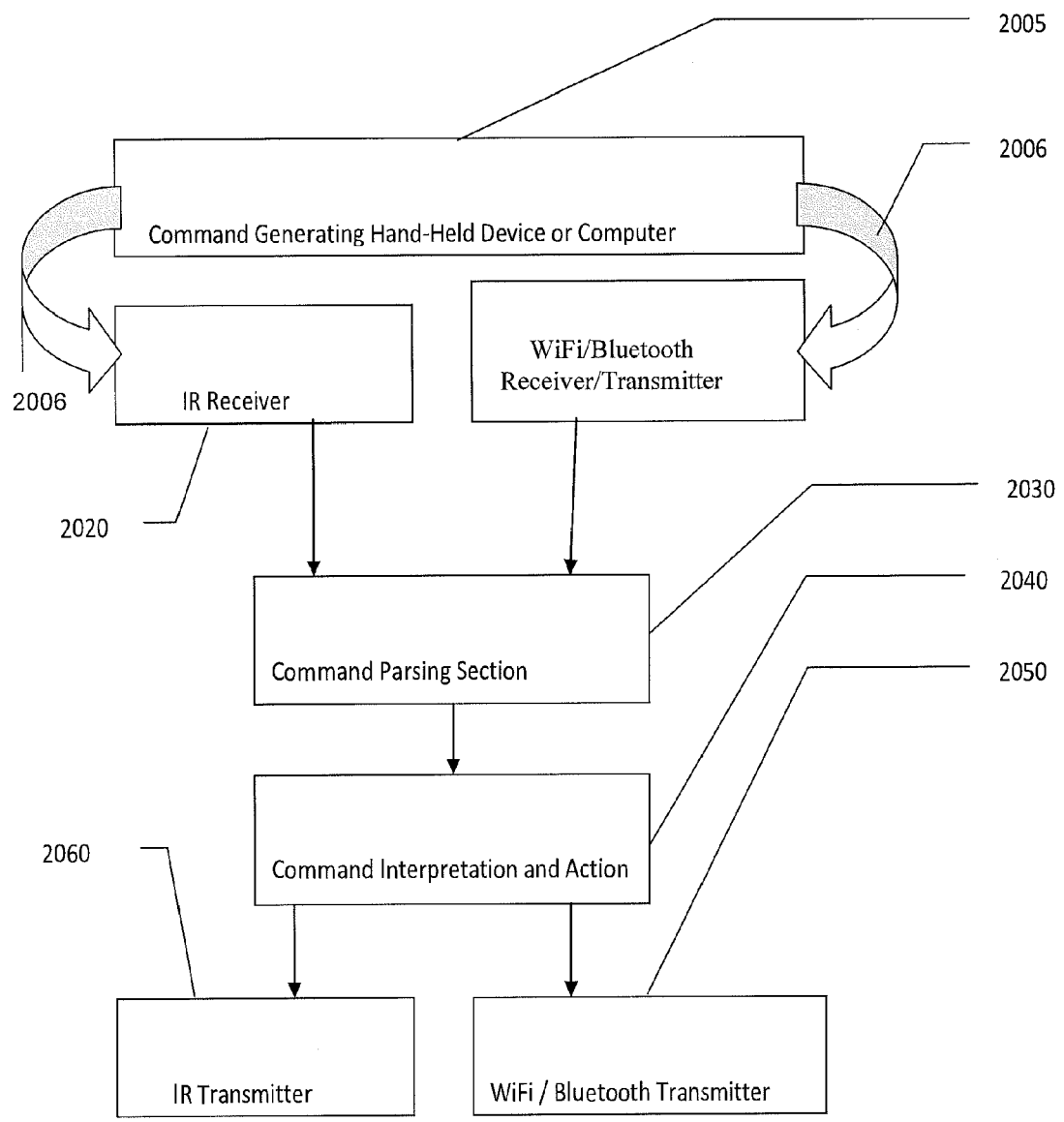
FIG. 5 illustrates a diagram of an embodiment of the user-initiated opinion polling system on a receiver/re-transmitter device.

FIG. 5 illustrates a diagram of an embodiment of the user-initiated opinion polling system on a receiver/re-transmitter device. In another embodiment, a receiver/re-transmitter device enables the operator of a control device (e.g., an infrared hand-held remote, a PC, a Laptop, a PDA, or a mobile phone running a remote control application) to use the said control device to issue voting commands (e.g., , etc.) as well as other typical control commands such as program selection, channel selection/change/up/down, ON/OFF, etc. to a TV, cable or satellite TV receiver that only has an infrared input interface. The Infrared/Wi-Fi/Bluetooth command receiver/re-transmitter device intercepts commands, interprets them, stores a copy in its memory for future use, sends the appropriate voting codes (e.g., ☺☺☺☺ ☻, etc.) to the world wide web server (to be stored, analyzed and later disseminated), and re-transmits the rest of the commands, using its Infrared transmitter, to the TV, cable or satellite TV receiver for which the command was initially intended by the operator of the control device. The Infrared command receiver/re-transmitter device is physically placed in front of the TV, cable or satellite TV receiver's Infrared receiving port such that both conditions below are met.

1) The receiver/re-transmitter device's Infrared transmitter has direct line of sight to the TV, cable or satellite TV receiver's Infrared receiver port.

2) The receiver/re-transmitter device also blocks the Infrared receiver port of the TV, cable or satellite TV receiver such that only the signals it (the receiver/re-transmitter device) sends can be received by the TV, cable or satellite TV receiver's Infrared port. Blocking the line of sight of any other Infrared signals to the TV, cable or satellite TV receiver port will ensure that only the signals that go through, and are re-transmitted, by the command receiver/re-transmitter device get to the intended target (TV, cable or satellite TV receiver), preventing undesirable interferences between different Infrared transmitters.

The logical operation of such device is provided in FIG. 5, which outlines an example infrared commands and information in the receiver/re-transmitter device.

In step 2005: Any device (e.g., an infrared remote control, a PC, a Laptop, a PDA, or a mobile phone running a remote control application) that is capable of issuing commands (using an Infrared, Bluetooth or Wi-Fi interface) can, at any time, issue a voting command (e.g., ☺☺☺☺ ☻, etc.) about the program being viewed, or a typical TV control command (e.g., channel change, program selection, volume control, ON/OFF, menu, information, on-demand, etc.) to control a TV, cable or satellite TV receiver that is only infrared enabled, provided that the actual command codes issued are those defined by the target device manufacturer.

In step 2006: Commands issued by the device described above (e.g., an infrared remote control, a PC, a Laptop, a PDA, or a mobile phone running a remote control application, etc.) are transmitted over the airwaves (using Infrared, Bluetooth or Wi-Fi technology).

In step 2010: The Wi-Fi or Bluetooth interface receives the commands (in bi-directional mode it also issues all necessary handshake and other protocol conforming commands as needed).

In step 2020: The Infrared receiver receives the commands (in bi-directional mode, if applicable, it also issues all necessary handshake and other protocol conforming commands as needed).

In step 2030: The received commands are parsed and the actual codes identified by the system.

In step 2040: The Command Interpretation and Action Module interprets each command to identify the action(s) that are to be taken by the system, if any. This may be done using a system that utilizes a two-dimensional finite state machine. In the cases that the command is a voting command (e.g., ☺☺☺☺ ☻, etc.) the required action is generally sending the vote code along with the information of the channel/program that is being watched, the time/day and any other relevant and available demographics to the server on the worldwide web. This is done using the Voting/Voicing Device Communication Format discussed earlier. A copy of all commands is locally saved in the memory so that the system always knows what channel is being watched (was last selected by the operator) and what program is being watched and/or being voted on.

In step 2050: The Wi-Fi/Bluetooth transmitter transmits the commands it has received from the Command Interpretation and Action Module, in most cases in essence "re-transmitting" what was received by the Infrared, Wi-Fi or Bluetooth receiver(s) described earlier.

In step 2060: The Infrared transmitter transmits (in essence "re-transmits") the commands it has received from the Command Interpretation and Action Module. In most cases, they will be identical to those issued by the operator, intended for the TV, cable or satellite receiver, and received by the Infrared receiver of the command receiver/re-transmitter device in module 2020.

Figure 6:
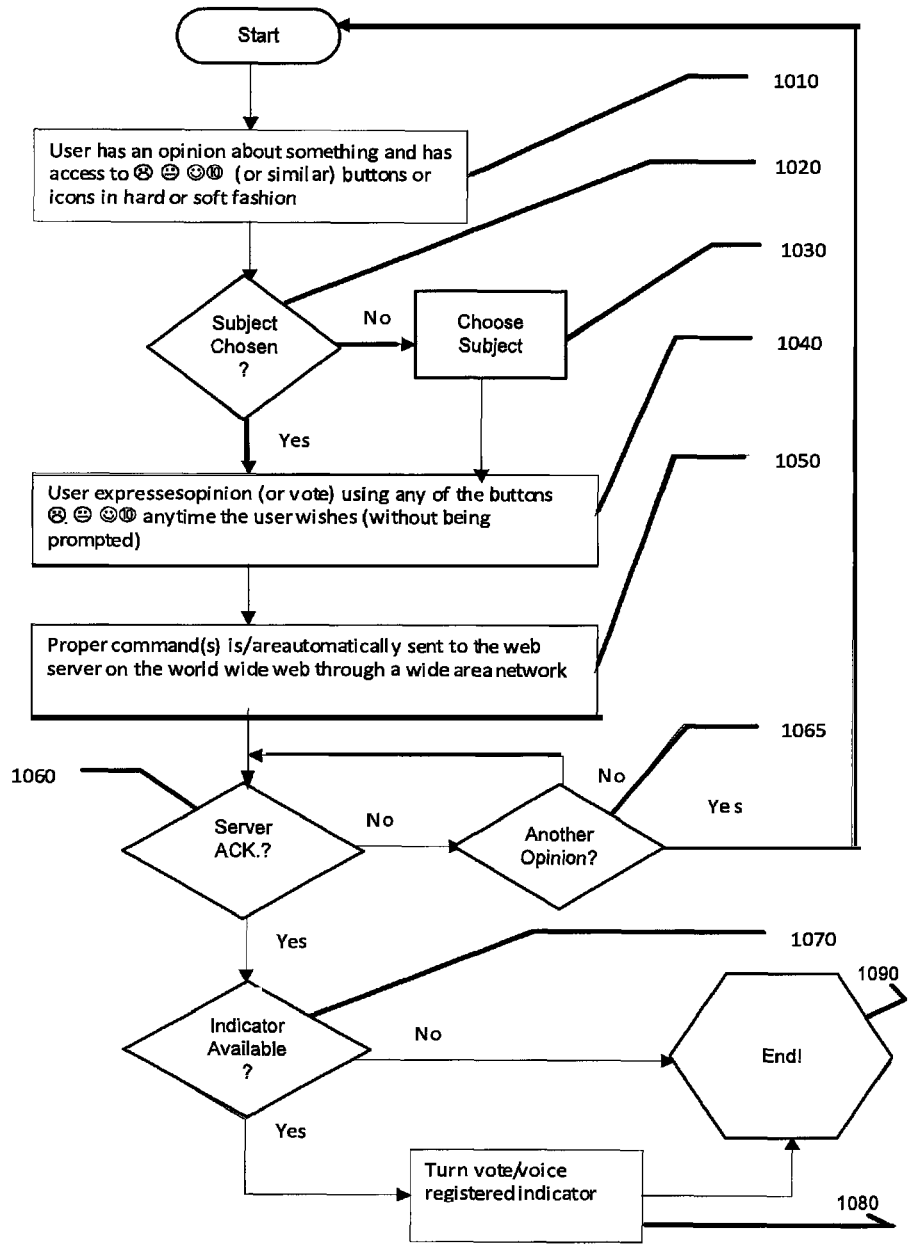
FIG. 6 illustrates a diagram of an embodiment of a user expressing an opinion in the client device and its application command structure.

FIG. 6 illustrates a diagram of an embodiment of a user expressing an opinion in the client device and its application command structure.

In step 1010: A user of a product or service is provided software- or hardware-based access to opinion expression buttons such as: ☺☺☺☺ ☻. These buttons may be provided to the user on his personal computing or communication device (e.g., a mobile phone, PC, laptop, desktop, browser running on a device, a PDA running a browser or running a downloaded application, a TV/satellite remote control, a mobile phone that can communicate with the world wide web, any other hardware or software device with ☺☺☺☺ ☻ opinion level buttons, etc.) The product or service of interest to the user, which may or may not be in use by the user at the time could be: 1) anything physical (e.g., a retails stores consumer product, a point of sales display, a billboard, etc.), 2) anything in the cyberspace (e.g., a web page, a website, software package, etc.), 3) an entertainment item (e.g., broadcast or recorded TV or radio program, cable, satellite, videogame, etc.) 4) anything else, physical or logical, a user may want to express his like/dislike about. The user desires to express his/her opinion about the product/service, or a particular part of the product or service (e.g., a moment in the TV program, a specific location/content of a web page, a particular item on a restaurant menu, a particular item on a retail point of sale display, etc.) and knowing that he has access to ☺☺☺☺ ☻ buttons he understands that he can, utilizing the said buttons, express his like/dislike or opinion about the subject.

In step 1020: When the user presses one of the opinion expression buttons (e.g., ☺☺☺☺ ☻, etc.), a specific subject is chosen, by the system automatically, or by the user manually, or a combination of user input and system figuring out certain subject-related information automatically.

In step 1030: Selection of the subject matter about which the user expresses his/her opinion can be done manually by providing the user with a means to input a subject code tag associated with the subject matter, or entering relevant information (e.g., program name, channel number, webpage URL, etc.) or by the system automatically determining on what item or subject the user is expressing opinion. For example, using the GPS information available to the device the user is using in conjunction with the channel number of the TV program the user is watching and the day/time information, the system can, using the data available on the world wide web, figure out exactly what part of which TV program the user is expressing his/her opinion on. The determination of the subject matter about which the user is expressing his/her opinion could also be done as a combination of user selected (e.g., by inputting or selecting from a menu of options) information and the system's automatic enhancement of the information (using the GPS, RFD, NFC, etc. data) to figure out the exact subject matter about which opinion(s) is/are being expressed. Using NFC (Near Field Communication) or any scanning technology, the user can choose a subject, or be aided in choosing a subject, also by touching, swiping, or moving his/her device in the proximity of something. The subject may also be chosen by the user speaking it in to a microphone on his device, which can recognize speech and convert it to computer data format.

In step 1040: Once the subject matter is chosen and available to the system, the user's pressing of any of the opinion expression/voting buttons (e.g., .) will cause an opinion about the specific item to be sent to a website where it will be further stored, disseminated, statistically analyzed, presented to users through the worldwide web, etc. As an alternative to pressing the iconic button, in some devices and modes the user can tap on the device, or shake the device gently vs. roughly (or anything in between) to express the same meaning of the iconic buttons. In these devices, the software assigns a tap or gentle shake to the button at one end of the opinion spectrum and four or more taps or rough shake to an opinion at the other extreme end of the opinion spectrum, while automatically training itself to assign intermediate number of taps or shakes to the corresponding intermediate opinions.

In step 1050: Sending the user opinion information can be done by any device, on or off the Internet, utilizing a command structure of the kind described in section "Device Voting/Voicing Device Communication Format".

In step 1060: Once the user opinion expression/vote is sent to the website, the system continues to monitor responses from the www server in form of an "Acknowledge or receipt of valid opinion/vote". Receipt of such acknowledge is not required as the server system may or may not always send such acknowledge responses. If the server does not send an 'Acknowledge' message, the opinion expression system will continue to monitor the server initiated communication until such time as either an acknowledge is received or the user initiates another opinion expression process, which will start the whole process from the top again.

In step 1065: If an acknowledge is not received but the user has initiated another opinion expression session by pressing one of the buttons: , the process will start again for the new opinion being expressed.

In step 1070: If an 'Acknowledge' is received, the system checks for availability of a mechanism to identify the user of the receipt of the acknowledge message from the server (e.g., an LED, a software icon, a light, vibration, tone, beep, audio or visual message, etc.).

In step 1080: If a mechanism such as one described in section 1070 exists, then the system utilizes that mechanism and the user is identified of the server acknowledge (e.g., tone sounded, icon appears, message sent/appeared, LED goes ON, etc.).

In step 1090: Once a command that contains a user expression or vote about an item has been sent to the server, and regardless of reception of an acknowledge or such acknowledge having been communicated to the user, the opinion expression/voting system is ready to accept another user opinion about another subject, item, or the same, again.

Voting/Voicing Device Communication Format

Different devices can communicate with the server through the Internet or other wide area networks such as the telephone or mobile phone networks. In addition to following the existing necessary applicable protocols (e.g., TCP/IP and H/XTML for the Internet, Text SMS protocol for mobile devices, etc.), each voting/voicing device sends certain command(s) and voting/voicing information to the server each and every time a user decides to express an opinion or vote about or on an item. The size of the command codes are variable and not necessarily similar. The logical format of each command is described below; however, the command structure described below can both be expanded to contain more sections, or shrunk to include fewer sections as necessary.

| Serial Number | Command Segment Content |
|---|---|
| 1 | Command ID Code |
| 2 | Number of Command Sections to Follow |
| 3 | Voting Device Type ID/Name (e.g., Mobile Phone, Browser, TV Remote, other appliance, etc.) |
| 4 | Voted Item Specific ID (Descriptor, Web content, product/service/event name or code, URL address, etc.) |
| 5 | Specifics of the Voted Item (e.g., tag, specific web page location or link, etc.) |
| 6 | Actual Vote/Opinion Code (e.g.,  Buttons) |
| 7 | Vote Demographics (e.g., Date/Time, GPS, User ID, Event-Indexed Time Stamp, etc.) |
| 8 | Vote Code (e.g., a unique number associated with this vote, assigned by the voting device) |
| 9 | End Vote Command ID |

DEFINITIONS

1) 'Command ID Code' specifies that the following parts of the packet(s) are associated with the voting/voicing opinion product/service. It also includes automatically generated codes that will be used by the server to authentication of the command as one generated by a user or a computer, etc.
2) 'Number of Command Sections to Follow' specifies how many command sub-section this command packet contains
3) 'Voting Device Type ID/Name' specifies what the device that is sending the command to the website is, such as a mobile phone, browser, a TV/Satellite remote control, a voting appliance, etc.
4) 'Voted Item Specific ID' specifies about what item the user, using the device, is expressing opinion. Examples are a specific location, item, person, an attribute of a person's, thing's or location's, location/item of a web page, an event, a broadcast, a movie, play, and event, a physical or imaginary item that has been assigned a 'tag' to identify it for voting/voicing opinion, ANYTHING, ANYONE, ANYWHERE. This could also be a URL or any other item/event/content tag/ID.
5) 'Specifics of the Voted Item' further describes the item being voted on.
6) 'Actual Vote/Opinion Code' specifies which user expression button (e.g., ) was chosen by the user.
7) 'Vote Demographics' specifies the exact time of the vote, expressed in local date/time format (e.g., January 2, 2013, at 4:21:45 PM), event-indexed time stamp which is the time within the event, indexed from the start of the event (e.g., at minute 21 and 33 seconds from the start of the event) followed by other demographics information that might be available to the device to send such as:

geographical location information or GPS information, User ID (if the user is registered with the service and/or is willing to provide this information voluntarily), etc.

8) 'Vote Code' is a unique number associated to this vote by the voting device. It is intended to prevent multiple counting of the same vote coming from the same device if so desired by the server.

9) 'End Vote Command ID' identifies the end of this command packet.

Example: expressing a 100% user-initiated opinion on a web page or specific Content of a web page using the buttons (☹☹☺☻ 😊)

Figure 7A:
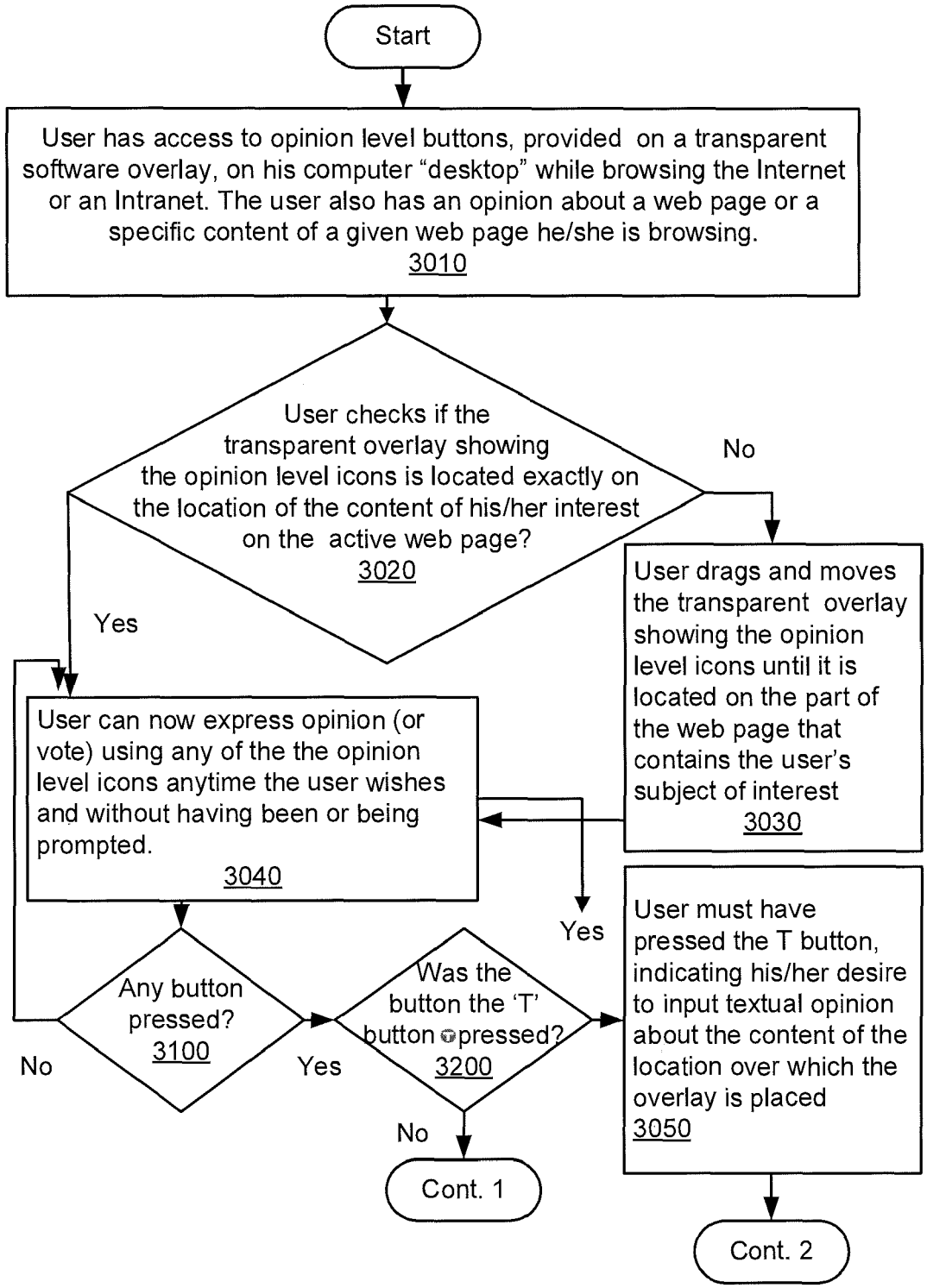
FIGS. 7a and 7b illustrate a diagram of an embodiment of the user-initiated opinion polling with a transparent graphic overlay.
Figure 7B:
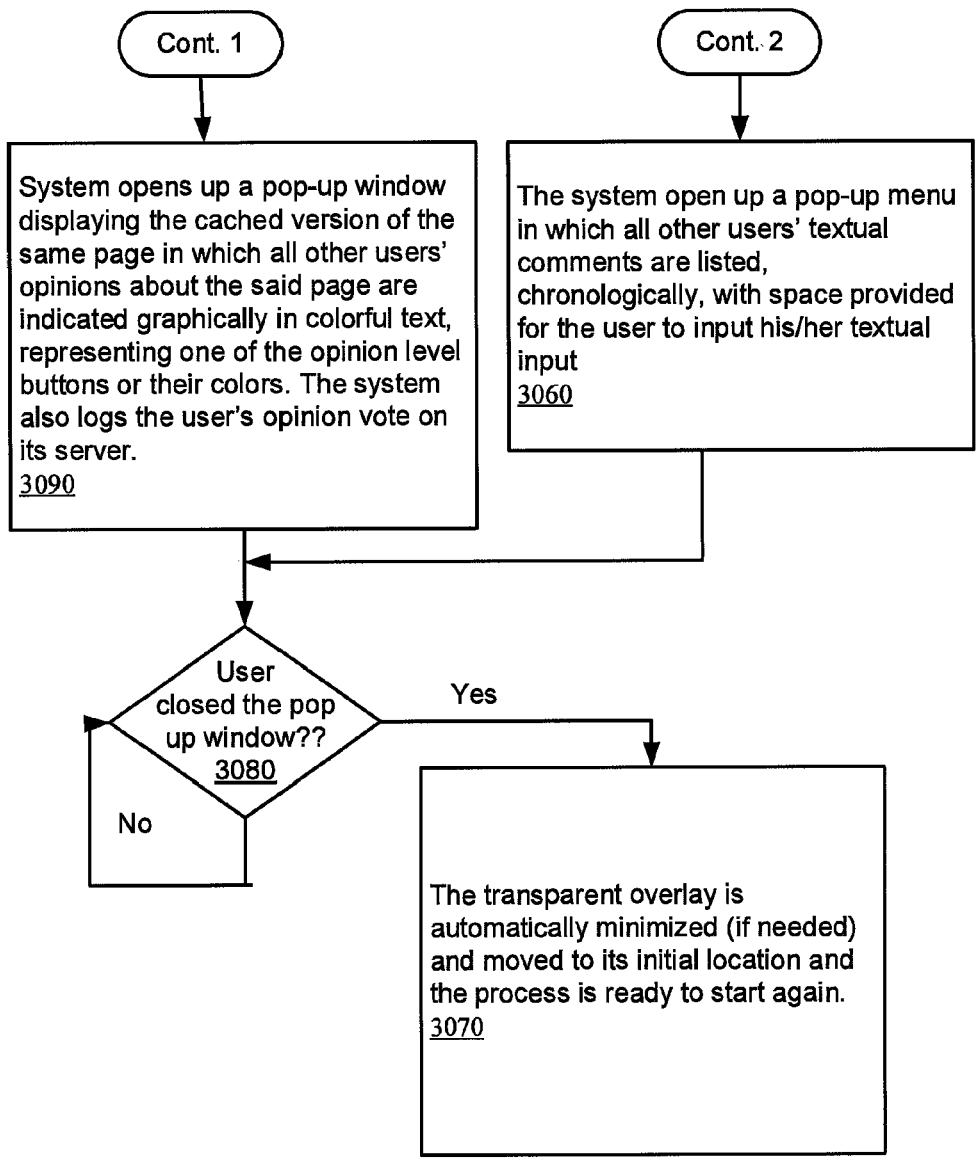

FIGS. 7a and 7b illustrate a diagram of an embodiment of the user-initiated opinion polling with a transparent graphic overlay. The user of a personal computer, a laptop or any other device that runs a browser or browser-like software able to access the world wide web, or any localized web-type network, is provided a small transparent desktop browser overlay displaying the buttons: (☹☹☺☻ 😊). The said overlay automatically works in conjunction with a web server on the World Wide Web (or the local network). The user can select and the drag and move the overlay to anywhere over an active web page (being browsed) in order to initiate the process of expressing/registering his/her opinion on, or to input textual comments about, the content of the specific location of the active web page on which the overlay is located at the time. The "T" 😊 button (or one similar) will perform at least 3 functions: 1) it opens a pop-up window in which comments, made by other users about the specific location of the active web-page (stored on the server in the world wide web) are listed chronologically, 2) enables the user to add a new text-based comment which is then automatically sent to and subsequently stored on the server on the world wide web, and 3) provides the user, in the new pop-up type window, a visual access to all the one-click ☹☹☺☻ opinion data, charts, graphs, etc. of other prior users who have expressed opinions before. The logical flow chart for the user expressing opinion device is provided in FIGS. 7A and 7B.

In step 3010, the user has access has to ☹☹☺☻ 😊 (or similar) buttons, that are provided on a transparent software overlay, on his/her computer "desktop", or other device on which he can browse, while browsing the Internet or an Intranet. The user also has an opinion about a web page or a specific content of a given web page (e.g., a text, a picture, video clip, a diagram, etc.) he/she is browsing. The transparent overlay software, which may be running in the background, always calculates, and therefore "knows", the position on the user's computer or device "desktop" it is, and was last, located.

In step 3020, the user checks if the transparent overlay showing the opinion level buttons "☹☹☺☻ 😊" is located exactly on the location of the content of his/her interest on the active web page being browsed.

In step 3030, the user selects, drags and moves the transparent overlay showing the opinion level buttons "☹☹☺☻ 😊" until it is located on the part of the web page that contains the user's subject of interest (about which the user wants to express an opinion). This part of the web page could be text, graphics, video, a link or any other valid web content.

In step 3040, once the transparent overlay showing the opinion level buttons "☹☹☺☻ 😊" is located on the content of the web page that is of the user's interest, the user can at any time, so long as the overlay has not been moved to a new location, express an opinion using the buttons that are available on the overlay. The system, automatically calculates and reads the location of the overlay as well as the content of the web page under it; therefore, any user opinions expressed can be appropriately tagged with the correct and necessary information and sent to the server on the world wide web using the format expressed in section "Opinion Voting/Voicing Device Communication Format" of this document.

In step 3050, when the system detects the user has pressed the 'T' 😊 button, indicating the user's desire to express an opinion textually, the system will perform the functions described in the following section, 3060.

In step 3060, The system performs multiple tasks, such as, but not limited to the following: 1) it opens a pop-up window in which comments, made by other users about the specific location of the active web-page (stored on the server in the world wide web) are listed chronologically, 2) enables the user to add a new comment which is then automatically sent to and subsequently stored on the server on the world wide web, and 3) provides the user, in the new pop-up type window, a visual access to all the one-click ☹☹☺☻ opinion data, charts, etc. of other prior users who have expressed opinions before.

In step 3070, the transparent overlay containing the opinion level buttons "☹☹☺☻ 😊" is automatically "minimized", if needed, and/or moved back to the initial position on the user's computer or device "desktop" it had prior to this particular session of the user's expressing his/her opinion about a specific part of the active web page.

In step 3080, the transparent overlay containing the opinion level buttons "☹☹☺☻ 😊" will remain where it is until the user moves it (by an action such as clicking and dragging it) to a new location or "closes" it indicating the user is done with this session of expressing his/her opinion about a web page content.

In step 3090, the system opens up a pop-up window displaying the server version of the same web page, that is automatically obtained over the Internet/Intranet by the system, in which all other users' opinions to date about the said page are indicated, graphically and/or in colorful text representing the opinion level buttons "☹☹☺☻ 😊" clicks. Representation of the historical opinion click data may take different graphical/textual formats (e.g., histograms, charts, bars, iconic, etc.), selectable by the user in real time or as set in his/her profile should he have one. The system also logs the user's opinion vote on its server, aggregating its database with the new opinion cast by the current user.

In step 3100, for as long as non of the opinion level buttons ☹☹☺☻ 😊 are pressed or the transparent overlay is not moved to a new location, the user can express his/her opinion, like/dislike, about the location of the web page on which the overlay is located. The software responsible for the overlay operation is constantly checking for buttons pressed, or overlay moved or not.

In step 3200, upon detecting a given opinion level button (any of ☹☹ ☺☻ 😊) pressed by the user, the overlay software performs different tasks depending on whether the pressed button is one of the four graphical like/dislike buttons (i.e., ☹☹☺☻) or the button "T" 😊 indicating the user's desire to input textual opinion or like/dislike comment. The system therefore checks for the button type so that the appropriate action(s) is/are taken depending the button that was pressed.

In an embodiment, the software used to facilitate the protocol and algorithms associated with the process can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. Any portion of the server implemented in software and any software implemented on the client device are both stored on their own computer readable medium in an executable format.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in a number of different programming languages. Also, an algorithm may be implemented with lines of code in software, configured logic gates in software, or a combination of both. The applications and algorithms may be scripted in any number of software program languages.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. For example, Hardware logic, such as Boolean logic gates, may be used to implement the same functions as software coding and vice versa. Also, combinations of logic and software may be used to implement the modules and algorithms herein. The invention is to be understood as not limited by the specific embodiments described herein, but only by scope of the appended claims.

The invention claimed is:

1. An apparatus, comprising:

an application resident on a client device that communicates over a network with a server and database, where the client device-server system is configured to enable a user of the client device to conduct a public-initiated opinion poll to express 1) likes, 2) dislikes or 3) any combination of the two about anything, anyone, anywhere, anytime;

a module configured to present a template for the opinion poll to allow greater specificity and user customizing of the opinion poll to the user of the client device initiating this opinion poll, where a user interface of the module presents a subject field on a display screen of the client device, and server is configured to recognize content in the subject field as choosing and setting a subject matter of the opinion poll, where the content of the subject field is solely initiated and decided by the user, and not preselected by a third party and then presented to the user of the client device to give their opinion about that preselected subject matter of the opinion poll, where the user interface and subject field are configured to enable the user of the client device to select an overall subject matter and even specific features about that subject matter, which the user wishes to create the opinion poll on, and the module is configured to enable the user of the client device to choose when to express his/her opinion, exactly about what subject matter to express his/her opinion on, and then to express his/her opinion level by activating a single opinion level button that has a very specific meaning; and where the client device communicates the content entered into the subject field of the user interface to set a name and subject matter of the opinion poll over the network to the server, and a software program resident on the server takes in the details of the opinion poll, and a backend server aggregates the opinion level expressed by activating the opinion level button with all of the cast opinion levels previously submitted by users of different client machines on this opinion poll and feeds this information back to the client device to be displayed on a display screen of the client device, where any portion of the server implemented in software and any software implemented on the client device are both stored on their own computer readable medium in an executable format.

2. The apparatus of claim 1, where the application resident on the client device is the module that presents the template for the opinion poll to allow greater specificity and user customizing of the opinion poll to the user initiating this poll and has the user interface coded to present the subject field.

3. The apparatus of claim 1, where a server applet is the module that presents the template for the opinion poll to allow greater specificity and user customizing of the poll to the user initiating this opinion poll and has the user interface code to present the subject field, and works with a browser application resident on the client device, where the server applet serves one or more web pages to the client device with the resident browser.

4. The apparatus of claim 1, where the module is configured to provide subjects about which the user of the client device may be interested in by both 1) on a home page of the server showing a listing of opinion poll topics and their associated statistics that any user visiting the home page may be interested in reviewing, which these opinion polls were originally generated by other user's opinion polls and then maintained on the server and database, and 2) the user interface of the module presents a search field configured to receive content of a query from the user device and then to bring back a listing of opinion poll topics and their associated statistics that the user of the client device may be interested in reviewing based on the content supplied in the query, and where the server categorizes and associates similar subject content to the content in the subject field and sends that similar subject content back down over the network to the client application on the client device.

5. The apparatus of claim 1, where the client device is a mobile client device powered by a battery and wirelessly connects with the server over an internet, and the module is a client application of the mobile client device that is scripted to allow the user to decide the subject matter of the opinion poll by two or more of the following 1) a putting in of text or symbols in the subject field, 2) the user speaking the subject matter of the opinion poll into a microphone of the client device, and the application using a speech to text routine to populate the subject field, 3) scan an object to be the subject matter of the opinion poll by swiping the mobile device against the object and a sensor inside the mobile device using Near Field Communication (NFC) or Radio Frequency IDentification (RFID) technologies recognizes that object and/or reads the object's ID code to populate the subject field, and 4) taking a picture of an object with a phone camera built into the client device and the client application is scripted to pass the image of the object for image recognition by the server and database, and the server then is configured to send down a list of one or more subject matters and their suggested words to populate the subject field based on relevancy to the recognized object in the picture.

6. The apparatus of claim 2, where the user interface presents only the subject field on which the subject matter of the opinion poll will be on, and the user is enabled to set the opinion poll on even a specific sub-feature of a given subject by filling in the text of the subject field and after the subject field is populated, then the client application changes a state of a set of opinion level button icons to allow one of them to be activated by the user to be the single opinion level button to cast their opinion rating/level on the subject matter of the opinion poll, and no text box is presented to the user for the user to make additional comments, and thus, the expressed opinion level about the subject matter of the opinion poll is encompassed by the user activating, such as pressing, the single opinion level button and the client application passing at least this information to the server and database for tabulation.

7. The apparatus of claim 1, where when the module receives confirmation that the subject matter of the opinion poll is chosen by the user, then the module offers the user with a limited number, less than ten, of opinion level buttons, which an activation of a given opinion level button registers a certain level of opinion including bad, good, and excellent, and the activating of that opinion level button is recognized by the module to both set the subject matter of the opinion poll and the user's opinion level, and the module then transmits the subject matter, opinion level, the time and date, and any client device sensor information collected by the module over the network to the server.

8. The apparatus of claim 1, where the module is configured to allow the user as well as any other user of an instance of the application to express an opinion level by two or more of the following 1) by activation of any of a limited number of three or more opinion level button icons but less than ten opinion level button icons, 2) by a software routine resident in the client application that translates detected tapping on the mobile device into a selection of a specific opinion level icon, and 3) by a software routine resident in the client application that translates a detected amount of force in a shake of the client device, gently or roughly, into a selection of a specific opinion level icon, then the application resident on its client device collects this information and communicates this opinion level on the subject matter of the opinion poll over the network to the server, which is passed onto the database, and thus, users of the application express their opinion level of approval or disapproval about the exact subject matter that a given user desires.

9. The apparatus of claim 2, where the application in the client device has a detector routine scripted to detect other applications on the client device as well as sensors built into the client device, and then capture information from these other applications and the sensors, and when the user wishes to express an opinion the application then transmits this sensor data and other resident application information along with the subject matter and opinion level information from the client device over the network to the server, where the client device sensory information includes two or more of the following Global Positioning System (GPS) information, Radio Frequency IDentification (RFID) information, Near Field Communication, and the sensor data is passed to the server so that the application on the server can look up subject matters in the database 1) close to this user's location, 2) closely related to the ID of this object, and 3) any combination of both in order to help the user to set and choose the subject matter of the opinion poll more easily by sending a list of suggested subject matters in a drop down menu or by pre-populating the subject field with these relevant words; and the user interface is configured to allow another user, who is also participating in the opinion poll, to create a secondary content on the specific feature of an initial subject matter of the opinion poll.

10. The apparatus of claim 2, where the software program resident on the server is coded to take in the details of the opinion poll, aggregate those details with any opinion poll data for this opinion poll stored in the database, and categorize those details, and the web application on the server cooperates over a wide area network with two or more client machines each having resident applications, and then the server checks the database to see 1) if the subject content, exactly as chosen or expressed, exists in the database as well as 2) if similar titles of subject content exist in the database, then the server returns the existing opinion polls in a list presented by the application for the user to select from if they choose, and when an existing poll is selected, the server returns the existing opinion poll and its statistics appear in the form of a chart.

11. The apparatus of claim 3, where when the user's opinion has been captured by a server applet resident on the server, the server applet sends back an acknowledgement to the browser of the client device indicating that the opinion was captured, where the server applet sends back an updated chart graph of the opinion poll to be displayed on the display screen of the client device, where the updated chart indicates at least a number of times each particular opinion level rating has been cast and total aggregate number of opinions cast are.

12. The apparatus of claim 3, where a user interface of the website serviced by the server allows business partners as well as users of client devices to view statistics in real-time in two or more of 1) a recorded profile of the opinion poll data, 2) an analyzed profile of the opinion poll data, 3) a raw profile of the opinion poll data, which allows business partners to search the opinion poll data by date, opinion level, and other parameters to provide real-time market research, and then a user interface of the client device offers a series of useful business choices based upon a subject matter of the opinion poll including 1) statistics of opinions on similar subjects or other businesses in the neighborhood, 2) presentation of relevant advertisements on the display of the client device directed by a business partner of the website, and 3) presentation of coupons on the display of the client device that the system determines the user may be interested based on voted likes/dislikes, current location indicated by GPS relative to the business address, and demographics of the user of the client device.

13. The apparatus of claim 2, where the application resident on the client device is scripted to start recording through its microphone an audio track and then communicates the audio track from a movie or other audio program along with a current date and time indicated on the client device over the network to the server potentially with other information including GPS of the client device, then the server may optionally return a selectable list of movies playing at that GPS location, and/or TV or Radio shows playing at that current time, to the client device to assist the user in identifying the source of the audio track, and where the server cooperates with the database to identify the source of the audio track that the microphone of the mobile device picked up by trying to find the same audio track in the database and match the time synchronized portions of the same audio track in the database, and the user interface also captures the user's activation of the opinion icons expressing their likes or dislikes with portions of the audio track that corresponds to segments/scenes within a movie or TV show; and thus, the user of the device casts an opinion level with time stamps on one or more segments within the movie, TV show or radio show and the segment supplied from the client device is matched up with the same time segments of the audio clip stored in the database, which then can be correlated to a particular scene within the movie, Radio show, or TV show, and the opinion level icons cast on that segment of show are tallied and posted like other opinion polls.

14. The apparatus of claim 2, where an internet plug in application is configured to work with a browser of the client device and the server to offer an Internet user viewing a web page a small transparent mouse-controlled movable overlay graphic representing soft buttons that indicate multiple selectable opinion level iconic choices, where the overlay detects the subject matter of the opinion poll by interrogating the web page, through any of image analysis, Optical Character Recognition, analyzing the coding structure of the web page, and thus, the user can move the overlay by dragging it to anywhere on the web page and then activate one of the soft opinion level buttons to express his/her opinion about the specific content or portion of the web page located immediately under the overlay at that moment, and the subject field will be pre-populated by text supplied by the server corresponding to the overlaid subject matter, and then the user can amend or override the populated text, and the application then sends the opinion level, time and date, and subject matter of the opinion poll to the server.

15. A computing-device implemented method in a client-server environment to facilitate a public opinion poll, comprising:
  initiating the public opinion poll on a media space, where a user of a client device in the client-server environment initiates the public opinion poll and also participates then in that public opinion poll;
  selecting by the user a subject matter of the opinion poll, where a content of the subject matter is decided and created by the user and not pre-selected by a third party;
  conducting the user initiated opinion poll on a media space on a server; and
  limiting the user to express an opinion level about anything to 1) activating of software-based opinion level buttons or hardware-based opinion level buttons, and any combination of both, 2) [or otherwise by] speaking into the client device and then the opinion level being translated via a speech to text application, or 3) tapping on the client device and the tapping being translated to a correlating opinion level button, in order to enable the user to express their opinion level about anything, anyone, anywhere, anytime, and without using a text based comment box.

16. The computing-device implemented method of claim 15, where a module in the client device is configured to allow the user as well as any other user of the media space to express their opinion level by the activation of the software-based opinion level buttons or hardware-based opinion level buttons, and any combination of both, then an application resident on the client device collects this information and communicates this opinion level on the subject matter of the opinion poll over a network to the server, which is passed onto a database, and thus, users of the application express their opinion level of approval or disapproval about an exact subject matter that a given user desires to.

17. The computing-device implemented method of claim 15, where an application in the client device has a detector routine scripted to detect other applications on the client device as well as sensors built into the client device, and then capture information from these other applications and the sensors, and when the user as well as any other user of an instance of the application wishes to express their opinion level, then the application transmits this sensor data and other resident application information along with the subject matter and opinion level information from the client device over the network to the server, where the application is configured to allow another user, who is also participating in the opinion poll, to create a secondary subject matter of the opinion poll where the secondary subject matter is on a specific feature of an initial subject matter of the opinion poll.

* * * * *

UNITED STATES PATENT AND TRADEMARK OFFICE
CERTIFICATE OF CORRECTION

| | | |
|---|---|---|
| PATENT NO. | : 8,732,605 B1 | Page 1 of 1 |
| APPLICATION NO. | : 13/070201 | |
| DATED | : May 20, 2014 | |
| INVENTOR(S) | : Ardeshi Falaki | |

It is certified that error appears in the above-identified patent and that said Letters Patent is hereby corrected as shown below:

In the Claims Section:

Column 24

Claim 15, Line 16, delete the bracketed phrase that states "[or otherwise by]"

Signed and Sealed this
Sixteenth Day of February, 2016

Michelle K. Lee
*Director of the United States Patent and Trademark Office*